United States Patent [19]

Coffey

[11] 3,996,605

[45] Dec. 7, 1976

[54] TIME BASE CORRECTOR

[75] Inventor: John Albert Coffey, Newbury, England

[73] Assignee: Quantel Limited, Berkshire, England

[22] Filed: June 2, 1975

[21] Appl. No.: 582,967

[30] Foreign Application Priority Data

June 6, 1974 United Kingdom ............. 25073/74

[52] U.S. Cl. .................................................. 358/8
[51] Int. Cl.² ...................... H04N 9/02; H04N 5/76
[58] Field of Search ......................... 358/8; 360/36; 178/69.5 DC, 6.6 TC

[56] References Cited

UNITED STATES PATENTS

| | | | |
|---|---|---|---|
| 3,860,952 | 1/1975 | Tallent et al. ........................... | 358/8 |
| 3,863,022 | 1/1975 | Bruch .................................... | 358/8 |
| 3,879,748 | 4/1975 | De Boer ................................ | 358/8 |

*Primary Examiner*—John C. Martin
*Assistant Examiner*—Mitchell Saffian
*Attorney, Agent, or Firm*—Dowell & Dowell

[57] ABSTRACT

A time base corrector for retiming the chrominance and luminance components of a non-phased television picture signal from a PAL video tape recorder to local reference syncs. The time base corrector comprises digital storage means and an analogue-to-digital converter connected to an input of the storage means. A digital-to-analogue converter is connected to the output of the storage means. "Read" clock pulse generating means are connected with the digital-to-analogue converter and the storage means to trigger the same. A first phase comparator means is operative to compare local horizontal reference signals with horizontal pulses from a divider connected to the "Read" clock pulse means for controlling the output frequency of the same. Horizontal synchronizing pulse addition means are connected with the output of the digital-to-analogue converter for receiving the analogue signal from the digital-to-analogue converter and imparting thereto a horizontal synchronizing pulse in exact time relationship with the line frequency. Heterodyning means are connected between the input to the corrector and the analogue-to-digital converter. A second phase comparator means is operative to compare the color burst output of the digital-to-analogue converter with a local sub carrier reference signal and to control the heterodyning means. The heterodyning means imparts to said analogue-to-digital converter a chrominace component signal having a frequency controlled with reference both to the off tape horizontal synchronizing pulses and to the required sub carrier reference frequency.

5 Claims, 1 Drawing Figure

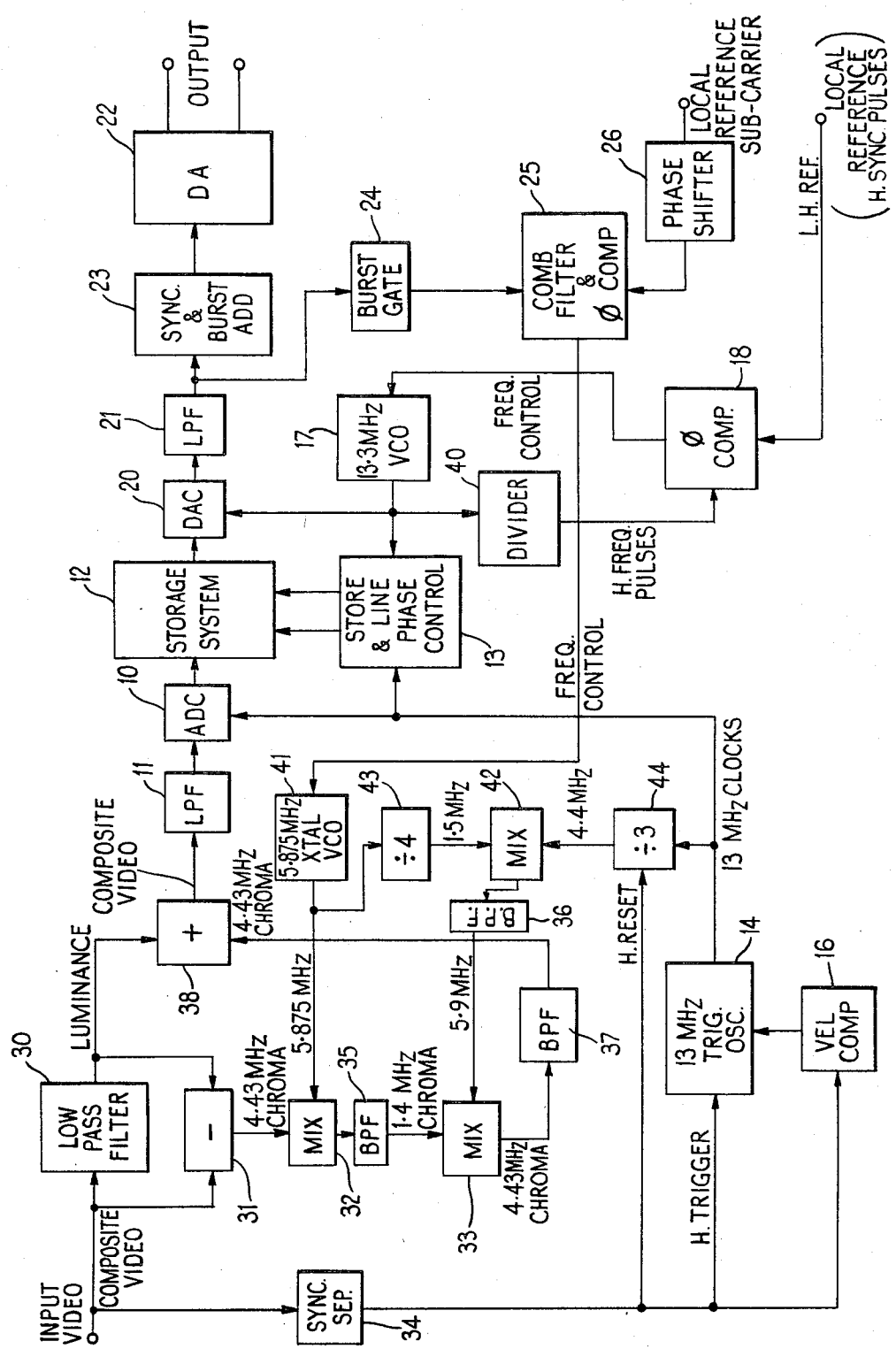

TIME BASE CORRECTOR

BACKGROUND OF THE INVENTION

This invention relates to time base correctors for use with video tape recorders which record non-phased 625 line PAL colour television signals or monochrome 625 line television signals.

The process of time base correction is necessary with video tape recorders because of the timing perturbations created by the mechanical components of the video tape recorder, i.e. the tape moving past a scanning head driven by some type of electric motor. These output timing perturbations which appear on the output video signal must be removed if the signal is to meet full broadcast timing stability specifications or if it is required to superimpose two video signals in some manner in any type of television installation. Different types of analogue time base correctors have been used with the more expensive video tape recorders, but their timing correction range has been limited. The use of a digital storage system enables a much wider timing correction range to be obtained. The storage system would perhaps contain four or more lines of storage and would produce a timing correction window of two or more television lines.

The time base corrector receives the signal from the video tape recorder containing the time base perturbations and produces a signal at the output which is continuous and accurately timed with respect to local synchronizing information.

In many PAL video tape recorders, the complete signal is not recorded directly on the tape using the FM system. Instead, the chrominance information is separated from the luminance by means of a high pass filter, then the low pass filtered luminance information is used to frequency modulate a carrier which is applied to the tape in the normal way, while the chrominance information at 4.43 MHz is heterodyned by a first mixing operation to a lower carrier frequency, around 1 MHz, and is then directly recorded on the tape without using the FM carrier system. Often the frequency used to mix with the incoming chrominance signal to produce the low frequency components to record directly on the tape is not related to either the incoming sub carrier frequency or the horizontal scanning frequency.

The composite signal is recovered again on playback by a second heterodyning operation to bring the chrominance information back up to approximately its original frequency, when it is then added back to the luminance signal. No exact relationship now exists between the new output colour sub carrier frequency of the VTR and the horizontal and vertical scanning frequency of the luminance signal. This is said to be the non-phased colour mode of operation. A signal of this kind does not meet broadcasting standards, neither can two signals of this type be mixed and faded properly as they would in general have different colour sub carrier frequencies.

OBJECT OF THE INVENTION

An object of the present invention is to provide an arrangement in which the sub carrier information on the output signal is capable of being shifted in phase with respect to the local locking sub carrier reference, so that the output signal may be phased accurately into a mixer or some other television apparatus.

SUMMARY OF THE INVENTION

According to the invention there is provided a time base corrector for retiming the chrominance and luminance components of a non-phased television picture signal from a PAL video tape recorder to local reference syncs, comprising digital storage means, analogue-to-digital converter connected to an input of the storage means, "Write" clock pulse generating means connected with the analogue-to-digital converter and the storage means to trigger the same, a digital-to-analogue converter connected to the output of the storage means, "Read" clock pulse generating means connected with the digital-to-analogue converter and the storage means to trigger the same, first phase comparator means being operative to compare local horizontal reference signals with horizontal pulses from a divider connected to the "Read" clock pulse generating means for controlling the output frequency of the same, horizontal synchronizing pulse addition means connected with the output of the digital-to-analogue converter for receiving the analogue signal from the digital-to-analogue converter and imparting thereto a horizontal synchronizing pulse in exact time relationship with the line frequency, heterodyning means connected between the input to the corrector and the analogue-to-digital converter, and second phase comparator means being operative to compare the colour burst output of the digital-to-analogue converter with a local sub carrier reference signal and to control the heterodyning means, wherein the heterodyning means imparts to said analogue-to-digital converter a chrominance component signal having a frequency controlled with reference both to the off tape horizontal synchronizing pulses and to the required sub carrier reference frequency.

BRIEF DESCRIPTION OF THE DRAWING

The invention will now be described with reference to the accompanying drawing which shows a circuit of the time base corrector of the present invention suitable for PAL non-phased mode of operation.

DESCRIPTION OF PREFERRED EMBODIMENT

The time base corrector comprises an analogue-to-digital converter 10 coupled at its input to a low pass filter 11. Converted signals from the converter 10 are written into a storage system 12 by means of a store and line phase control circuit 13, under the control of clock pulses derived from the horizontal synchronizing pulses on the input signal as will be described below. These clock pulses are at a frequency of approximately 13.3 MHz which is an integral multiple of horizontal synchronizing frequency. These pulses are produced by a triggered oscillator circuit 14 which is triggered under the control of input horizontal synchronizing pulses derived from a sync pulse separator 34. The frequency of the triggered oscillator 14 is modified by a velocity compensation circuit 16 which operates line-by-line on the frequency of the triggered oscillator 14. An example of this velocity compensation circuit is described in co-pending U.S. patent application Nos. 558,090 and 558,091.

The stored signal is read from the storage system 12 by read clock pulses from the store and line phase control circuit 13. These read clock pulses are produced in a 13.3 MHz phase locked loop system comprising a 13.3 MHz voltage controlled oscillator 17, together with its appropriate output divider chains 40, and a horizontal synchronizing pulse phase comparator 18 having one input connected to the terminal L.H. Ref which receives local horizontal synchronizing pulses, and its other input connected to an output of a divider 40. The divider has its input connected to the output of the oscillator 17.

The resultant data stream from the store 12 is digital-to-analogue converted by digital-to-analogue converter 20 and then passes via a low pass filter 21 to the output distribution amplifier 22 after being re-blanked and having clean mixed synchronizing pulses added to it by the synchronizing and burst adder 23.

The video signal after digital-to-analogue conversion and filtering by the low pass filter 21 also passes to a burst gate circuit 24 where the analogue sub carrier burst is separated and fed to a phase comparator 25 where it is compared against local sub carrier reference received from terminal S.C. Ref via a phase shifter circuit 26. The phase comparator 25 contains a comb filter using a 1-line delay so that two output bursts are averaged together to remove the line-by-line alternation of the $r - y$ component. This produces a fixed phase burst with which to compare the local sub carrier reference. Off tape and reference PAL indent signals are compared and adjustment is made in the store control system to match the V axis phase of the store output signal with the output reference PAL ident. The phase shifter circuit 26 in the input sub carrier reference enables an output signal from the time base corrector to be sub carrier phased with respect to a reference signal for mixing and superimposing purposes.

The input signal from the video tape recorder applied to the input of the corrector of the present invention is passed first through two heterodyning processes which serve two purposes. a) They re-introduce the same timing perturbations on the chrominance components at the input to the analogue-to-digital as on the base band luminance components. b) They translate the sub carrier frequency to another frequency which bears the correct relationship with the horizontal and vertical scanning frequency.

This process is accomplished by first passing the complete video input signal through a low pass filter 30 which has a cut off at approximately 3 MHz. The resulting low pass filtered signal is then subtracted from the complete input signal in the subtractor circuit 31 thus producing the components above the cut off frequency of 3 MHz at the output of the subtractor circuit.

These chrominance components at the output of subtractor circuit are then first mixed at mixer 32 with a 5.875 MHz signal from the crystal voltage controlled oscillator 41. The output of mixer 32 contains the chrominance information at the input but now centred around the difference frequency at 1.5 MHz. This is fed via band pass filter 35 to mixer 33 whose carrier input is a 5.9 MHz signal derived from mixer 42 via band pass filter 36. The two inputs to mixer 42 are a 1.4 MHz signal from the divide by four circuit 43 and a 4.4 MHz signal from the divide by three circuit 44. The input of the divider 43 receives the output of the 5.875 MHz VCO 41 whilst the input of divider 44 receives the 13 MHz output from the triggered oscillator 14.

The 4.4 MHz output signal of divider 44 contains the timing perturbations which are imposed upon the separated sync signal derived from the output of the video tape recorder. Because this frequency is at 4.4 MHz this means that the phase perturbations are those required to be impressed upon the final chrominance signal to be added to the luminance signal in combiner circuit 38. The frequency of the 5.875 MHz oscillator 41 is controlled from the output sub carrier phase comparator 25, by comparing the off tape sub carrier burst with the reference sub carrier.

By controlling the oscillator 41 in this way the required sub carrier frequency is obtained at the output of mixer 33 to be fed to the combiner circuit 38, via band pass filter 37 there to be added to the low pass filtered luminance components before passing to the analogue-to-digital converter 10 and hence onto the storage system 12 and the output of the time base corrector.

In the present time base corrector, by using a heterodyning process on the chrominance components at the input to the time base corrector, and controlling the heterodyning frequency with reference both to the off tape horizontal sync pulses and to the required sub carrier reference on the output side of the time base corrector, the correctly related sub carrier frequency is produced at the input to the analogue-to-digital converter, also containing the same timing perturbations as the luminance components. Hence, when these timing perturbations are removed through the storage system, both luminance and chrominance components are correctly timed at the output and the colour sub carrier frequency has the correct relationship to the horizontal and vertical scanning frequencies.

The invention is applicable to all types of video tape recorder, i.e. quadruplex as well as helical scan but additional circuitry may be required for its use with quadruplex video tape recorders.

I claim:
1. A time base corrector for retiming the chrominance and luminance components of a non-phased television picture signal from a PAL video tape recorder including off-tape horizontal sync pulses and color bursts to local horizontal sync pulse frequency and local sub carrier reference frequency, said corrector comprising:
    a. digital storage means having an input and an output;
    b. an analog-to-digital converter having an input and having an output connected to the input of the storage means;
    c. "Write" clock pulse generating means connected with the analog-to-digital converter and the storage means to clock signals from said converter into said storage means;
    d. a digital-to-analog converter connected to the output of the storage means to deliver an analog signal;
    e. "Read" clock pulse generating means having an output clock pulse frequency, the "Read" clock pulses being connected with the digital-to-analog converter and with the storage means to read stored signals into the converter from said storage means;
    f. a divider connected to the output of said "Read" clock generating means and operative to deliver divided frequency pulses at the local horizontal sync pulse frequency;
    g. first phase comparator means connected to said divider to compare the local horizontal sync pulse frequency with the divided pulse frequency from said divider and connected to the "Read" clock pulse generating means for controlling the output frequency thereof;

h. horizontal synchronizing pulse addition means connected with an output of the digital-to-analog converter for receiving the analog signal from the digital-to-analog converter and for adding thereto a horizontal synchronizing pulse in exact time relationship with the local horizontal sync frequency;

i. heterodyning means having a controlled frequency oscillator and having an input connected to receive said non-phased television signal and having an output connected to the analog-to-digital converter; and j. second phase comparator means having an input connected to the digital-to-analog converter output to compare the frequency of the colour burst from the stored signal with the local sub carrier frequency and having an output connected to the heterodyning means to control the frequency of said controlled frequency oscillator in dependance on said compared frequencies, whereby the heterodyning means provides at the input to said analog-to-digital converter a chrominance component having a frequency controlled with reference both to the off-tape horizontal synchronizing pulses and to the required sub carrier reference frequency.

2. A time base corrector according to claim 1, wherein said heterodyne means comprises a low pass filter connected to pass components of the non-phased picture signal, a subtractor circuit for receiving the low-pass filtered signal and for subtracting this signal from the complete picture signal to deliver chrominance components above the filter cut-off frequency at an output of said subtractor circuit, a first mixer connected to the output of said subtractor circuit and to said controlled frequency oscillator of said heterodyning means, a second mixer connected to an output of said first mixer and to a second heterodyning frequency source, said second heterodyning frequency source being derived from the "Write" clock pulse generating means, and adder means for adding the resulting output from said second mixer to the low pass filter luminance components before passing to the analog-to-digital converter.

3. A time base corrector according to claim 2, wherein said second heterodyning frequency source is derived from the "Write" clock pulse generating means via a second divider and a third mixer, said third mixer being connected to receive the output from said controlled frequency oscillator via a third divider whereby the third mixer produces said second heterodyning frequency.

4. A time base corrector according to claim 1, wherein a burst gate circuit is connected to the output of the digital-to-analog converter, the burst gate being operative to separate said analog sub carrier burst and feed it to said second phase comparator.

5. A time base corrector according to claim 4, wherein said second phase comparator contains a comb filter using a 1-line delay so that two output bursts are averaged together to remove the line-by-line alternation of the $r-y$ component.

* * * * *